United States Patent
Urtel et al.

(10) Patent No.: US 9,034,432 B2
(45) Date of Patent: May 19, 2015

(54) METHOD FOR PRODUCING A SWELLING NONWOVEN FABRIC

(75) Inventors: Bolette Urtel, Bobenheim-Roxheim (DE); Christian Krueger, Speyer (DE); Klaus-Peter Neugebauer, Bobenheim-Roxheim (DE); Klaus Haas, Ludwigshafen (DE); Ralf Mossbach, Lindenberg (DE)

(73) Assignee: BASF SE, Ludwigshafen (DE)

( * ) Notice: Subject to any disclaimer, the term of this patent is extended or adjusted under 35 U.S.C. 154(b) by 363 days.

(21) Appl. No.: 13/376,491

(22) PCT Filed: Jun. 1, 2010

(86) PCT No.: PCT/EP2010/057603
§ 371 (c)(1),
(2), (4) Date: Dec. 6, 2011

(87) PCT Pub. No.: WO2010/142568
PCT Pub. Date: Dec. 16, 2010

(65) Prior Publication Data
US 2012/0094566 A1    Apr. 19, 2012

(30) Foreign Application Priority Data
Jun. 8, 2009    (EP) .................................... 09162165

(51) Int. Cl.
| | | |
|---|---|---|
| *B05D 3/02* | (2006.01) |
| *C09D 4/06* | (2006.01) |
| *D04H 13/00* | (2006.01) |
| *C08F 2/22* | (2006.01) |
| *D06M 15/263* | (2006.01) |
| *D06M 15/333* | (2006.01) |
| *D06M 15/347* | (2006.01) |
| *D06M 15/53* | (2006.01) |

(52) U.S. Cl.
CPC .. *C09D 4/06* (2013.01); *B05D 3/02* (2013.01); *D04H 13/00* (2013.01); *C08F 2/22* (2013.01); *D06M 15/263* (2013.01); *D06M 15/333* (2013.01); *D06M 15/347* (2013.01); *D06M 15/53* (2013.01)

(58) Field of Classification Search
None
See application file for complete search history.

(56) References Cited

U.S. PATENT DOCUMENTS

| | | | |
|---|---|---|---|
| 6,221,973 B1 * | 4/2001 | Arkens et al. ............. 525/327.7 |
| 6,262,159 B1 | 7/2001 | Dreher et al. |
| 2007/0117903 A1 | 5/2007 | Mukherjee et al. |
| 2007/0212321 A1 | 9/2007 | Braig et al. |
| 2008/0153371 A1 * | 6/2008 | Losch et al. ................. 442/118 |
| 2008/0185553 A1 | 8/2008 | Ziemer et al. |
| 2008/0194753 A1 | 8/2008 | Mukherjee et al. |
| 2009/0252962 A1 | 10/2009 | Michl et al. |
| 2010/0041291 A1 | 2/2010 | Weber et al. |

FOREIGN PATENT DOCUMENTS

| | | |
|---|---|---|
| DE | 10 2004 061 144 | 6/2006 |
| DE | 10 2004 063 004 | 7/2006 |
| WO | 2005 012378 | 2/2005 |

OTHER PUBLICATIONS

International Search Report Issued Aug. 4, 2010 in PCT/EP10/057603 Filed Jun. 1, 2010.

\* cited by examiner

*Primary Examiner* — Erma Cameron
(74) *Attorney, Agent, or Firm* — Oblon, McClelland, Maier & Neustadt, L.L.P.

(57) ABSTRACT

Swellable nonwovens with reduced washoff loss are produced.

26 Claims, No Drawings

METHOD FOR PRODUCING A SWELLING NONWOVEN FABRIC

CROSS REFERENCE TO RELATED APPLICATIONS

This application is a national stage of PCT/EP10/057,603, filed Jun. 1, 2010, which claims priority to European Application 09162165.6, field Jun. 8, 2009, the contents of each of which are hereby incorporated herein by reference.

The present invention provides a process for producing a swellable nonwoven by contacting a fibrous web with a water-in-water dispersion of a polymer P prepared by free-radically initiated polymerization of at least one ethylenically unsaturated monomer MON in the presence of at least one each of water-soluble polymers A and polymers B in an aqueous medium, said at least one water-soluble polymer A being selected from
(a1) graft polymers of vinyl acetate and/or vinyl propionate on polyalkylene glycol or one- or both-sidedly alkyl-, carboxyl- or amino-substituted polyalkylene glycol,
(a2) copolymers of alkylpolyalkylene glycol(meth)acrylates and (meth)acrylic acid,
(a3) polyalkylene glycols,
(a4) one- or both-sidedly alkyl-, carboxyl- or amino-substituted polyalkylene glycols,
and said at least one water-soluble polymer B being selected from
(b1) hydrolyzed copolymers of vinyl alkyl ethers and maleic anhydride as a free polyacid or at least partially neutralized with alkali metal hydroxides or ammonium bases,
(b2) starch, modified or unmodified,
(b3) synthetic copolymers obtainable by copolymerization of
  ($\beta$1) one or more nonionic monoethylenically unsaturated monomers,
  ($\beta$2) one or more cationic monoethylenically unsaturated monomers, and
  ($\beta$3) optionally one or more anionic monoethylenically unsaturated monomers,
the molar fraction of cationic monoethylenically unsaturated monomers ($\beta$2) interpolymerized in (b3) being higher than the fraction of interpolymerized anionic monoethylenically unsaturated monomers ($\beta$3), and subsequently drying the resulting impregnated fibrous web,
wherein at least one organic compound V, which has at least two functional groups selected from the group comprising hydroxyl groups, epoxy groups, primary and secondary amino groups, is admixed to the water-in-water dispersion of said polymer P before and/or during the contacting with the fibrous web and/or applied to the impregnated fibrous web after the contacting and before the drying step.

Processes for preparing water-in-water dispersions of polymers P and the use thereof are known in principle. WO 2005/12378 discloses the preparation of these water-in-water dispersions of polymers P and their use in principle as thickeners. DE-A 10 2004 058 271 discloses the use of the polymers P as auxiliaries in the production of textile auxiliaries, such as print pastes, dyeing liquors, coating compositions or finishing liquors. DE-A 10 2004 063 004 further discloses the production and use of swellable nonwovens as waterproofing membranes, for example for road, tunnel and water engineering and also for excavations, highwater protection and roof-sealing systems by using water-in-water dispersions of the polymers P. However, the swellable nonwovens disclosed as per DE-A 10 2004 063 004 are not always fully satisfactory with regard to the washoff loss of polymer P from the swellable nonwovens.

It is an object of the present invention to reduce the washoff losses of the swellable nonwovens produced by means of a water-in-water dispersion of a polymer P.

We have found that this object is achieved, surprisingly, by the swellable nonwovens produced by following the process defined at the outset.

Fibrous webs are familiar to a person skilled in the art. Herein the term "fibrous webs" is to be understood as meaning, for example, nonwovens, formed-loop knits, wovens or drawn-loop knits or combinations thereof. A nonwoven is typically a body which has not been woven nor loop-formingly knitted and which may comprise fibers or ribbons. Formed-loop knits are textile bodies formed by forming interentwined loops which support each other. Wovens are textile bodies formed of yarns or ribbons which cross at right angles and are produced on weaving machines for example. The fibrous webs used according to the present invention are advantageously nonwovens, for example spunbonded nonwovens, needled nonwovens or else hydroentangled nonwovens. The nonwovens may be consolidated mechanically, thermally or chemically in a manner familiar to a person skilled in the art. Fibrous webs useful for the present invention preferably comprise sheetlike structures of any desired thickness, more preferably from 1 to 300 mm in thickness for the sheetlike structures, particularly from 1 to 20 mm or from 1 to 10 mm.

The fibrous webs which can be used for the purposes of the present invention can consist of ribbons or of fibers, in which case the latter are preferred. Suitable ribbon are in particular tapes composed of textile materials, or film tapes composed of customary film materials, for example plastics such as polyethylene and/or polypropylene. The fibers used may be staple fibers or continuous fibers (filaments). The fibers may be for example synthetic, mineral or natural in kind, in which case especially synthetic and/or mineral fibers are used. Examples of synthetic fibers are fibers composed of polyolefin, such as polyethylene or polypropylene, polyesters, such as polyethylene terephthalate or polybutylene terephthalate, polyamide, polysulfone and/or polyether ketone. Mineral fibers may consist for example of ceramic materials, silicon carbide and/or boron nitride. It is also possible to use fibers composed of carbon or glass fibers.

Preferred materials for the fibrous webs are polyolefins, such as polyethylene, polypropylene, polyesters, such as polyethylene terephthalate, polybutylene terephthalate, polyamides, polysulfones and/or polyether ketones, but in particular polyolefins and polyesters.

Water-in-water dispersions of polymer P and processes for preparing these dispersions are known to a person skilled in the art from WO 2005/12378 page 2 line 38 to page 9 line 23 and also DE-A 10 2004 063 004 sections [0045] to [0092]. Both documents are expressly incorporated herein by reference, and forming the aforementioned water-in-water dispersions shall be a constituent part of this specification.

The water-in-water dispersions of polymer P are prepared by free-radically induced polymerization of at least one ethylenically unsaturated monomer MON in the presence of at least one each of water-soluble polymers A and polymers B in an aqueous medium, said at least one water-soluble polymer A being selected from
(a1) graft polymers of vinyl acetate and/or vinyl propionate on polyalkylene glycol or one- or both-sidedly alkyl-, carboxyl- or amino-substituted polyalkylene glycol,
(a2) copolymers of alkylpolyalkylene glycol(meth)acrylates and (meth)acrylic acid, (a3) polyalkylene glycols,
(a4) one- or both-sidedly alkyl-, carboxyl- or amino-substituted polyalkylene glycols,
and said at least one water-soluble polymer B being selected from
(b1) hydrolyzed copolymers of vinyl alkyl ethers and maleic anhydride as a free polyacid or at least partially neutralized with alkali metal hydroxides or ammonium bases,
(b2) starch, unmodified or preferably cationically or anionically modified,
(b3) synthetic copolymers obtainable by copolymerization of
  (β1) one or more nonionic monoethylenically unsaturated monomers,
  (β2) one or more cationic monoethylenically unsaturated monomers, and
  (β3) optionally one or more anionic monoethylenically unsaturated monomers,
the molar fraction of cationic monoethylenically unsaturated monomers (β2) interpolymerized in (b3) being higher than the fraction of interpolymerized anionic monoethylenically unsaturated monomers (β3).

The preparation of the herein utilized water-in-water dispersions of polymers P by polymerization of at least one ethylenically unsaturated monomer (MON) will now be described in detail.

Useful ethylenically unsaturated monomers (MON) include preferably water-soluble nitrogenous ethylenically unsaturated monomers or water-soluble anionic ethylenically unsaturated monomers. Water-soluble herein is to be understood as referring to monomers whose solubility in 100 g of deionized water at 20° C. and atmospheric pressure (1 atm=1.013 bar absolute)≥10 g, advantageously ≥30 g and more advantageously ≥50 g.

Suitable water-soluble nitrogenous ethylenically unsaturated monomers are preferably N-vinylformamide, N-vinylacetamide, N-vinylimidazole and N-vinylpyrrolidone or mixtures of two or more of the aforementioned monomers.

Useful water-soluble anionic ethylenically unsaturated monomers are preferably monoethylenically unsaturated $C_3$- to $C_6$-carboxylic acids, for example monoethylenically unsaturated $C_3$- to $C_6$-mono- and dicarboxylic acids, such as acrylic acid, methacrylic acid, ethacrylic acid, crotonic acid, itaconic acid, maleic acid or fumaric acid, and also ethylenically unsaturated sulfonic acids, in particular vinylsulfonic acid, styrenesulfonic acid, in particular para-styrenesulfonic acid, 2-acrylamido-2-methylpropanesulfonic acid, and also

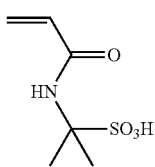

or vinylphosphonic acid

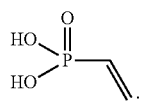

The aforementioned water-soluble anionic ethylenically unsaturated monomers can each be utilized as a free acid or in the form of their alkali metal or ammonium salts.

Preferred water-soluble anionic ethylenically unsaturated monomers for use as principal monomers include acrylic acid, methacrylic acid, maleic acid, 2-acrylamido-2-methylpropanesulfonic acid and/or vinylsulfonic acid, of which acrylic acid is particularly preferred.

Water-soluble anionic ethylenically unsaturated monomers may be homopolymerized to form homopolymers or else copolymerized in mixture with each or one another or with other comonomers to form copolymers. Examples are the homopolymers of acrylic acid or copolymers of acrylic acid with methacrylic acid and/or maleic acid.

Suitable comonomers include in principle ethylenically unsaturated comonomers which are nonionic or can bear a positive charge, i.e., are cationic. Examples of suitable nonionic or cationic comonomers are (meth)acrylamide, acrylic esters of $C_1$-$C_4$-alkanols, for example methyl acrylate, ethyl acrylate, n-propyl acrylate, isopropyl acrylate, n-butyl acrylate, isobutyl acrylate, sec-butyl acrylate, tert-butyl acrylate, methacrylic esters of methanol or ethanol, vinyl acetate, vinyl propionate, mono- or diallyldi($C_1$-$C_4$-alkyl)ammonium salts, especially halides of the formula

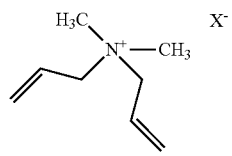

where $X^-$ is selected from for example fluoride, bromide, iodide and especially chloride, 2-[N,N-di($C_1$-$C_4$-alkyl)amino]ethyl(meth)acrylates, 3-[N,N-di($C_1$-$C_4$-alkyl)aminopropyl(meth)acrylates, where each $C_1$-$C_4$-alkyl may be different or preferably the same and selected from ethyl, n-propyl, isopropyl, n-butyl, isobutyl and preferably methyl, very particular preference being given to 2-(N,N-dimethylamino)ethyl(meth)acrylate and 3-(N,N-dimethyl)aminopropyl(meth)acrylate,
N-vinylimidazole and $C_1$-$C_4$-alkyl- or benzyl-quaternized N-vinylimidazole, useful counterions including for example halide, especially bromide or chloride, or hydrogensulfate.

Basic comonomers such as 2-[N,N-di($C_1$-$C_4$-alkyl)amino] ethyl(meth)acrylates and 3-[N,N-di($C_1$-$C_4$-alkyl)aminopropyl(meth)acrylates can be used in the copolymerization not only in the form of free bases but also in partially or fully buffered form.

Nonionic and/or cationic comonomers can preferably be added in such amounts in the course of the preparation of the polymers P used according to the present invention that the resulting polymers are water-soluble and have a net anionic charge, which may be stabilized for example by alkali metal cations or ammonium cations, which may be substituted. Based on the total ethylenically unsaturated monomers used in the polymerization, the amount of nonionic and/or cationic comonomers can be for example in the range from 0% to 99% or 0% to 45% by weight.

Preferred polymers are for example polymers comprising 55% to 100% by weight of acrylic acid and/or methacrylic acid in interpolymerized form.

One specific embodiment of the present invention utilizes crosslinked polymers P prepared using a so-called ethylenically unsaturated crosslinker.

Crosslinked polymers are obtainable by conducting the polymerization in the additional presence of at least one ethylenically unsaturated crosslinker. Polymers are then obtained with a higher molecular weight than when polymerizing at least one ethylenically unsaturated monomer (MON) in the absence of such a crosslinker. Crosslinked polymers prepared in this way have a high water uptake capacity. Useful crosslinkers include all compounds having two or more ethylenically unsaturated double bonds in the molecule. Such compounds are familiar to a person skilled in the art and are used for example in the preparation of crosslinked polyacrylic acids, such as superabsorbent polymers (cf. EP-A 858 478).

Examples of particularly suitable crosslinkers are: triallylamine, pentaerythritol triallyl ether, methylenebis(meth)acrylamide, N,N'-divinylethyleneurea, fully acrylated or methacrylated dihydric or polyhydric alcohols having 2 to 4 carbon atoms such as ethylene glycol di(meth)acrylate, 1,4-butanediol di(meth)acrylate, di(meth)acrylates of polyethylene glycols having molecular weights $M_n$ of for example 300 to 600 g/mol, compounds of the general formula I

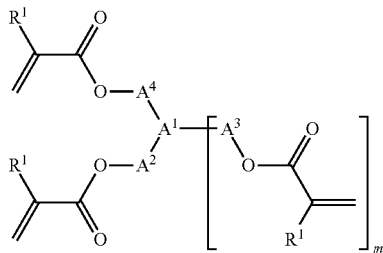

I in each of which the variables are defined as follows:
$R^1$ is in each occurrence the same or different and selected from methyl and hydrogen;
m is an integer from 0 to 2 and preferably 1;
$A^1$ is $CH_2$ or $—CH_2—CH_2—$ or $R^2—CH$ or para-$C_6H_4$ when m=0,
CH, $R^2—C$ or 1,3,5-$C_6H_3$ when m=1,
and carbon when m=2;
$R^2$ is selected from $C_1$-$C_4$-alkyl, such as for example n-$C_4H_9$, n-$C_3H_7$, iso-$C_3H_7$ and preferably $C_2H_5$ and $CH_3$, or phenyl,
$A^2$, $A^3$ and $A^4$ are the same or different and each is selected from
$C_1$-$C_{20}$-alkylene, such as for example $—CH_2—$, $—CH(CH_3)—$, $—CH(C_2H_5)—$, $—CH(C_6H_5)—$, $—(CH_2)_2—$, $—(CH_2)_3—$, $—(CH_2)_4—$, $—(CH_2)_5—$, $—(CH_2)_6—$, $—(CH_2)_7—$, $—(CH_2)_8—$, $—(CH_2)_9—$, $—(CH_2)_{10}—$, $—CH(CH_3)—(CH_2)_2—CH(CH_3)—$;
cis- or trans-$C_4$-$C_{10}$-cycloalkylene, such as for example cis-1,3-cyclopentylidene, trans-1,3-cyclopentylidene, cis-1,4-cyclohexylidene, trans-1,4-cyclohexylidene;
$C_1$-$C_{20}$-alkylene in which from one to seven nonadjacent carbon atoms are replaced by oxygen, such as for example $—CH_2—O—CH_2—$, $—CH_2—CH_2—O$, $—(CH_2)_2—O—CH_2—$, $—(CH_2)_2—O—(CH_2)_2—$, $—[(CH_2)_2—O]_2—(CH_2)_2—$, $—[(CH_2)_2—O]_3—(CH_2)_2—$;
$C_1$-$C_{20}$-alkylene substituted with up to 4 hydroxyl groups and having from one to respectively seven nonadjacent carbon atoms replaced by oxygen, such as for example $—CH_2—O—CH_2—CH(OH)—CH_2—$, $—CH_2—O—[CH_2—CH(OH)—CH_2]_2—$, $—CH_2—O—[CH_2—CH(OH)—CH_2]_3—$;
$C_6$-$C_{14}$-arylene, such as for example para-$C_6H_4$, and also 2,2-bis(hydroxymethyl)butanol tri(meth)acrylate, pentaerythritol tri(meth)acrylate, pentaerythritol tetraacrylate and triallylmethylammonium chloride.

When one or more crosslinkers are to be used in the preparation of polymers P of at least one ethylenically unsaturated monomer (MON), the amount of crosslinker used in each case will be for example in the range from 0.001% to 5.0% by weight and preferably from 0.01% to 1.0% by weight, based on the total amount of the total amount of the ethylenically unsaturated monomers MON used in the polymerization.

The polymerization reaction in an aqueous medium is typically initiated using polymerization initiators which are familiar to a person skilled in the art and which form free radicals under the reaction conditions. Suitable polymerization initiators are for example peroxides, hydroperoxides, hydrogen peroxide, persulfates, such as for example sodium persulfate, potassium persulfate or ammonium persulfate, redox catalysts and azo compounds such as 2,2'-azobis(N,N-dimethyleneisobutyramidine)dihydrochloride, 2,2'-azobis(4-methoxy-2,4-dimethylvaleronitrile), 2,2'-azobis(2,4-dimethylvaleronitrile) and 2,2'-azobis(2-amidinopropane) dihydrochloride). Polymerization initiators are used in customary amounts for emulsion polymerizations (0.1% to 5% by weight, based on the sum total of the ethylenically unsaturated monomers (MON) used for polymerization). Preference is given to using azo initiators or persulfates as polymerization initiators. However, the free-radical polymerization reaction can also be initiated by means of high-energy rays such as electron beams or by irradiating with UV light.

One embodiment of the present invention utilizes water-in-water dispersions of the polymers P where the polymer concentration is for example from 1% to 70% by weight, preferably from 5% to 50% by weight and particularly from 15% to 25% by weight, all based on the sum total of the total amounts of monomers MON, polymers A and polymers B. The polymer concentration can also be referred to as solids content.

The water-in-water dispersions of polymers P used according to the present invention are prepared by free-radically initiated polymerization of at least one ethylenically unsaturated monomer (MON) in the presence of at least one each of water-soluble polymers A and polymers B, said at least one water-soluble polymer A being selected from
(a1) graft polymers of vinyl acetate and/or vinyl propionate on polyalkylene glycol or one- or both-sidedly alkyl-, carboxyl- or amino-substituted polyalkylene glycol,
(a2) copolymers of alkylpolyalkylene glycol(meth)acrylates and (meth)acrylic acid,
(a3) polyalkylene glycols,
(a4) one- or both-sidedly alkyl-, carboxyl- or amino-substituted polyalkylene glycols,
and said at least one water-soluble polymer B being selected from
(b1) hydrolyzed copolymers of vinyl alkyl ethers and maleic anhydride as a free polyacid or at least partially neutralized with alkali metal hydroxides or ammonium bases,
(b2) starch, unmodified or preferably cationically or anionically modified,
(b3) synthetic copolymers obtainable by copolymerization of
(β1) one or more nonionic monoethylenically unsaturated monomers,
(β2) one or more cationic monoethylenically unsaturated monomers, and
(β3) optionally one or more anionic monoethylenically unsaturated monomers, the molar fraction of cationic monoethylenically unsaturated monomers (β2) interpolymerized in (b3) being higher than the fraction of interpolymerized anionic monoethylenically unsaturated monomers (β3).

The water-in-water dispersions of polymers P used according to the present invention are likewise obtainable in the presence of at least two different ones of the aforementioned water-soluble polymers A and B.

The water-in-water dispersions of polymers P obtained after the polymerization reaction have at pH 4 for example a dynamic viscosity in the range from 100 to 12 000 mPas, preferably 150 to 6000 mPas (measured in a Brookfield viscometer at 23° C.).

Useful water-soluble polymers A of group (a1) include graft polymers of vinyl propionate or of mixtures of vinyl propionate and vinyl acetate, preferably of vinyl acetate on polyalkylene glycol, preferably polyethylene glycol or one- or both-sidedly alkyl-, carboxyl- or amino-substituted polyalkylene glycol, preferably polyethylene glycol. Polyalkylene glycols useful as a grafting base are described for example in WO 03/046024 page 4 line 37 to page 8 line 9. The grafting base is grafted for example with from 10 to 10 000, preferably 30 to 300 parts by weight of vinyl propionate, mixture of vinyl propionate and vinyl acetate or preferably vinyl acetate per 100 parts by weight of grafting base. Very particular preference for use as grafting base is given to polyethylene glycol having a number average molecular weight $M_n$ of 1000 to 100 000 g/mol.

Useful water-soluble polymers A of group (a2) include copolymers of alkylpolyalkylene glycol(meth)acrylates and (meth)acrylic acid, preference being given to copolymers of alkylpolyalkylene glycol acrylates and (meth)acrylic acid. Such compounds are known as dispersants for cement for example. They are prepared by first esterifying addition products of ethylene oxide and/or propylene oxide onto for example $C_1$- to $C_{18}$-alcohols with acrylic acid and/or methacrylic acid and then copolymerizing the resultant esters with acrylic acid and/or methacrylic acid. Typically employed water-soluble polymers of group (a2) comprise for example 5% to 60% by weight and preferably from 10% to 35% by weight of interpolymerized units of alkylpolyalkylene glycol (meth)acrylates and from 95% to 40% by weight and preferably from 90% to 65% by weight of interpolymerized units of (meth)acrylic acid. Their number average molecular weight $M_n$ is mostly in the range from 2000 to 50 000, preferably in the range from 5000 to 20 000 g/mol. Water-soluble polymers of group (a2) can be used in the preparation of aqueous dispersions used according to the present invention in the form of the polyacids or else in fully or partially neutralized form. Carboxyl groups of the water-soluble polymers of group (a2) may preferably be neutralized with aqueous sodium hydroxide solution, aqueous potassium hydroxide solution or ammonia.

Suitable water-soluble polymers A of group (a3) are polyalkylene glycols, preferably polyethylene glycols.

Polyalkylene glycols and especially polyethylene glycols used as water-soluble polymers A of group (a3) in one embodiment of the present invention can have a number average molecular weight $M_n$ in the range from 100 to 100 000 g/mol, preferably in the range from 300 to 80 000 g/mol, more preferably in the range from 600 to 50 000 g/mol and especially in the range from 1000 to 50 000 g/mol, the molecular structure of polyalkylene glycols being defined above. Preferred polyalkylene glycols (a3) are polyethylene glycol, polypropylene glycol and also block copolymers of ethylene oxide and propylene oxide. Block copolymers may comprise interpolymerized units of ethylene oxide and propylene oxide in any desired amounts and in any desired order, and have two or more blocks.

Suitable water-soluble polymers A of group (a4) are one- or both-sidedly alkyl-, carboxyl- or amino-substituted polyalkylene glycols and especially polyethylene glycols, for example having number average molecular weights $M_n$ in the range from 100 to 100 000 g/mol, preferably in the range from 300 to 80 000 g/mol, more preferably in the range from 600 to 50 000 g/mol and especially in the range from 1000 to 50 000 g/mol. Preferred water-soluble polymers A of group (a4) are one- or both-sidedly alkyl-, carboxyl- or amino-substituted polyethylene glycols, polypropylene glycols and also block copolymers of ethylene oxide and propylene oxide; block copolymers may comprise interpolymerized units of ethylene oxide and propylene oxide in any desired amounts and in any desired order, and have two or more blocks. Suitable alkyl groups are $C_1$-$C_{20}$-alkyl and especially unbranched $C_1$-$C_{20}$-alkyl. Suitable carboxyl groups are for example pivalate and propionate and especially acetate and also benzoate. Amino groups can be selected from $NH_2$ and mono- and di-$C_1$-$C_4$-alkylamine groups and cyclic amino groups such as for example

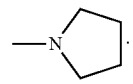

Aqueous polymer systems used according to the present invention comprise at least one water-soluble polymer A of groups (a1), (a2), (a3) or (a4) for example in amounts from 2% to 15% and preferably from 5% to 12% by weight, based on the aqueous polymer system obtained.

As water-soluble polymers B of group (b1) there are used preferably partially or quantitatively hydrolyzed copolymers of vinyl alkyl ethers, for example vinyl $C_1$-$C_4$-alkyl ethers, and maleic anhydride. $C_1$-$C_4$-Alkyl is selected from methyl, ethyl, n-propyl, isopropyl, n-butyl, isobutyl, tert-butyl and preferably methyl or ethyl. Water-soluble polymers B of group (b1) are obtainable by copolymerizing vinyl alkyl ethers with maleic anhydride and subsequent partial or quantitative hydrolysis of the anhydride groups to carboxyl groups and optionally partial or complete neutralization of the carboxyl groups. Particularly preferred water-soluble polymers B of group (b1) are hydrolyzed copolymers of vinyl methyl ether and maleic anhydride as a free polyacid and in the form of salts at least partially neutralized with aqueous sodium hydroxide solution, aqueous potassium hydroxide solution or ammonia.

Suitable water-soluble polymers B of group (b2) are starch, modified starch, preferably cationically or anionically modified. Examples of modified starches are cationically modified potato starch, anionically modified potato starch, degraded potato starch and maltodextrin. Examples of cationically modified potato starches are the commercial products Amylofax 15 and Perlbond 970. A suitable anionically modified potato starch is Perfectamyl A 4692. Here the modification consists essentially in a carboxylation of potato starch for example benzoate, pivalate and especially acetate. C*Pur 1906 is an example of an enzymatically degraded potato starch and Maltodextrin C 01915 is an example of a hydrolytically degraded potato starch.

Further suitably water-soluble polymers B are synthetic preferably random copolymers (b3), obtainable by copolymerization of (β1) at least one monomer selected from (meth)acrylamide, N-vinylformamide, N-vinylpyrrolidone and N-vinylcaprolactam, very particular preference being given to acrylamide and N-vinylpyrrolidone, and (β2) one or more cationic monoethylenically unsaturated monomers selected from di-$C_1$-$C_4$-alkylamino-$C_2$-$C_4$-alkyl (meth)acrylate, for example 2-(N,N-dimethylamino)-ethyl (meth)acrylate, 3-(dimethylamino)propyl(meth)acrylate, 2-(N,N-diethylamino)ethyl(meth)acrylate, 3-(diethylamino) propyl(meth)acrylate, each partially or quantitatively neutralized for example with halohydric acids such as for example hydrochloric acid, with sulfuric acid, para-toluenesulfonic acid, formic acid or acetic acid, or partially or quantitively quaternized with $C_1$-$C_4$-alkyl or benzyl, for example through reaction with $C_1$-$C_4$-alkyl halide such as for example $C_1$-$C_4$-alkyl bromide or iodide, through reaction with di-$C_1$-$C_4$-alkyl sulfate or with benzyl halide such as for example benzyl bromide or benzyl chloride. Further suitable monomers (β2) are dimethyldiallylammonium chloride, diethyldiallylammonium chloride, dimethyldiallylammonium bromide, diethyldiallylammonium bromide.

One or more anionic monoethylenically unsaturated monomers (β3) can be interpolymerized as well, selected from (meth)acrylic acid, vinylsulfonic acid, vinylphosphonic acid, maleic acid, fumaric acid, itaconic acid, crotonic acid, each as a free acid or as an alkali metal or ammonium salt, the molar fraction of cationic monoethylenically unsaturated monomers (β2) interpolymerized in (b3) being higher than the fraction of interpolymerized anionic monoethylenically unsaturated monomers (β3).

Polymers B of group (b3) can have a K value in the range from 15 to 200, preferably in the range from 30 to 150 and more preferably in the range from 45 to 110, determined after H. Fikentscher (Cellulose-Chemie, volume 13, pages 58 to 64 and 71 to 74, 1932) in 3% by weight aqueous NaCl solution at 25° C., a pH of 7 and a polymer concentration of 0.1% by weight.

One embodiment of the present invention comprises synthetic preferably random polymers B of group (b3) constructed from 2 to 90, preferably 20 to 80 and more preferably 30 to 70 mol % of at least one monomer (β1), and
2 to 90, preferably 20 to 80 and more preferably 30 to 70 mol % of at least one cationic monoethylenically unsaturated monomer (β2).

Another embodiment of the present invention comprises synthetic preferably random polymers B of group (b3) constructed from 2 to 90, preferably 10 to 80 and more preferably 20 to 70 mol % of at least one monomer (β1),
2 to 90, preferably 10 to 80 and more preferably 20 to 70 mol % of at least one cationic monoethylenically unsaturated monomer (β2), and
0.1 to 8, preferably up to 10 and more preferably 20 mol % of at least one anionic monoethylenically unsaturated monomer (β3).

The solubility of comonomers ([1]) in water at 25° C. is preferably not less than 100 g/l and most preferably they are miscible with water in any proportion.

Suitable examples of polymers B of group (b3) are those prepared by copolymerization of acrylamide and 2-(N,N-dimethylamino)ethyl acrylate methochloride, acrylamide and 2-(N,N-dimethylamino)ethyl methacrylate methochloride, methacrylamide and 2-(N,N-dimethylamino)ethyl acrylate methochloride, methacrylamide and 2-(N,N-dimethylamino)ethyl methacrylate methochloride, acrylamide, 2-(N, N-dimethylamino)ethyl acrylate methochloride and acrylic acid, acrylamide, 2-(N,N-dimethylamino)ethyl methacrylate methochloride and acrylic acid.

A particularly suitable water-soluble polymer B of group (b2) is enzymatically degraded starch, especially maltodextrin.

The total amount of the water-soluble polymers B in the water-in-water dispersions used according to the present invention is in the range from 1% to 100% by weight, preferably in the range from 2% to 80% by weight and more preferably in the range from 10% to 50% by weight, all based on the total amount of monomers MON.

The ratio of the total amounts of water-soluble polymers A and water-soluble polymers B in the water-in-water dispersions used according to the present invention is generally in the range from 1:10 to 10:1, preferably in the range from 1:5 to 5:1 and more preferably in the range form 1:2 to 2:1.

Aqueous water-in-water dispersions used according to the present invention preferably comprise a combination of
(a1) at least one graft polymer of vinyl acetate on polyethylene glycol with a number average molecular weight $M_n$ in the range from 1000 to 100 000 g/mol
and
(b1) at least one hydrolyzed copolymer of vinyl methyl ether and maleic anhydride as a polyacid or at least partially neutralized with aqueous sodium hydroxide solution, aqueous potassium hydroxide solution or ammonia.

In a preferred embodiment of the water-in-water dispersion of polymer P used according to the present invention, the dispersion comprises inorganic salts in an amount ranging from 0.001% to 15% by weight and preferably ranging from 0.1% to 5% by weight, based on the total amount of polymer P (corresponding to the sum total of the total amounts of monomers MON, polymers A and polymers B).

The amounts of polymer P which are used according to the present invention range from 1 to 300 parts by weight, preferably from 10 to 200 parts by weight and more preferably from 50 to 150 parts by weight of polymer P, based on 100 parts by weight of fibrous web.

In the process of the present invention, at least one organic compound V, which has at least two functional groups selected from the group comprising hydroxyl groups, epoxy groups, primary and secondary amino groups, is admixed to the water-in-water dispersion of said polymer P before and/or during the contacting with the fibrous web and/or applied to the impregnated fibrous web after the contacting and before the drying step.

In principle any organic compound having at least two functional groups selected from the group comprising hydroxyl, epoxy, primary and secondary amino groups can be used as compound V. According to the present invention, the average molecular weight of compound V can be >1000 g/mol, although preference is given to organic compounds V that have an average molecular weights 1000 g/mol.

Examples of organic compounds V having an average molecular weight>1000 g/mol are polyethylene glycols, polypropylene glycols, polytetramethylendiols, polyethylene glycol diglycidyl ethers, polypropylene glycol diglycidyl ethers, polyether amines, such as polyalkylene glycol diamines, such as for example polyethylene glycol diamine or polypropylene glycol diamine, and also polyethyleneimines.

However, it is preferable according to the present invention to use organic compounds V that have an average molecular weights 1000 g/mol. Useful compounds V include, in particular, linear or cyclic di- or polyol compounds, alkanolamine compounds, di- or polyamine compounds, mono-, di- or polysaccharides and also di- or polyepoxy compounds. Preference according to the present invention is given to such compounds V as are selected from the group comprising ethanolamine, diethanolamine, triethanolamine, 3-amino-1-propanol, 1-amino-2-propanol, 5-amino-1-pentanol, 2-(2-aminoethoxy)ethanol, N-(2-aminoethyl)ethanolamine, bis (N-hydroxyethyl)propane-1,3-diamine, diisopropanolamine, triisopropanolamine, N-methyldiethanolamine, N-butyldiethanolamine, ethylene glycol, diethylene glycol, triethylene glycol, 1,2-propanediol, 1,2,3-propanetriol, 1,2-butanediol, 1,4-butanediol, 2,3-butanediol, neopentyl glycol, trimethylolpropane, 1,2-pentanediol, 1,5-pentanediol, 1,6-hexanediol, 2,5-dimethyl-2,5-hexanediol, D-arabinose, L-arabinose, D-xylose, D-glucose, D-mannose, D-gallactose, D-glucosamine, D-fructose, maltose, sucrose, lactose, ethylenediamine, diethylenetriamine, triethylenetetramine, 1,3-propanediamine, 1,2-propanediamine, neopentyldiamine, hexamethylenediamine, octamethylenediamine, N-(2-aminoethyl)propane-1,3-diamine, 1,2,3-propanetriamine, N,N-bis(3-aminopropylamine), ethylene glycol diglycidyl ether, diethylene glycol diglycidyl ether, 1,2-propylene glycol diglycidyl ether and di-1,2-propylene glycol diglycidyl ether.

Particular preference for use as organic compounds V is given to triethanolamine, diethanolamine, 3-amino-1-propanol, D-glucose and/or ethylene glycol diglycidyl ether.

According to the present invention, the organic compounds V are used in a total amount of 0.001 to 10 parts by weight, preferably 0.001 to 5 parts by weight and more preferably 0.01 to 2 parts by weight, all based on 100 parts by weight of polymer P.

In the process of the present invention, in addition to the at least one organic compound V, optionally additionally at least one phosphorus- or boron-containing inorganic compound B is admixed to the water-in-water dispersion of said polymer P before and/or during the contacting with the fibrous web and/or applied to the impregnated fibrous web after the contacting and before the drying step.

Useful phosphorus- or boron-containing inorganic compounds B include in principle any inorganic phosphorus or boron compound capable in the drying step of speeding the crosslinking reaction of the polymer P with the organic compound V.

Preference according to the present invention is given to phosphoric acid, polyphosphoric acid, alkylphosphinic acid, alkylphosphonous acids, where alkyl is methyl, ethyl, propyl, isopropyl, n-butyl or tert-butyl, hypophosphorous acid, phosphorous acid or tetrafluoroboric acid and also alkali metal salts thereof, in particular the sodium and/or potassium salts thereof, such as for example alkali metal hypophosphites, alkali metal phosphites, alkali metal polyphosphates, alkali metal phosphates, alkali metal dihydrogenphosphates and/or alkali metal tetrafluoroborate.

When inorganic compounds B are used, they are used in a total amount of 0.0001 to 10 parts by weight, preferably of 0.01 to 7 parts by weight and more preferably 0.1 to 5 parts by weight, based on 100 parts by weight of polymer P.

According to the present invention, at least one organic compound V is admixed to the water-in-water dispersion of the polymer P before and/or during the contacting with the fibrous web and/or applied to the impregnated fibrous web after the contacting and before the drying step. When the at least one organic compound V is admixed to the water-in-water dispersion before the contacting with the fibrous web, it is optionally possible for some or all of the compound V to be initially charged in the course of the preparation of the water-in-water dispersion and for the remaining rest or total amount, as the case may be, to be added after the preparation of the water-in-water dispersion. It is also possible according to the present invention for some of the compound V to be optionally admixed to the water-in-water dispersion before the contacting with the fibrous web and for the remaining rest or total amount to be admixed to the water-in-water dispersion during the contacting with the fibrous web. In a further embodiment according to the present invention, it is optionally possible to apply some of the compound V to the impregnated fibrous web during the contacting with the fibrous web and the remaining rest or total amounts to be applied to the impregnated fibrous web before the drying step. It is self-evidently also possible for partial quantities of the compound V to be admixed to the water-in-water dispersion of the polymer P before and during the contacting with the fibrous web and to be applied to the impregnated fibrous web.

Preferably, however, the organic compound V is admixed to the water-in-water dispersion of the polymer P before and/or during the contacting with the fibrous web.

It will be appreciated that the process of the present invention, in addition to inorganic compounds B, can utilize still further optional auxiliary materials familiar to a person skilled in the art, examples being so-called thickeners, superplasticizers, defoamers, neutralizing agents, buffer substances or preservatives. When the process of the present invention utilizes such optional compounds, these can be admixed to the water-in-water dispersion of the polymer P before and/or during the contacting with the fibrous web and/or be applied to the impregnated fibrous web after the contacting and before the drying step. The amounts in which these optional compounds are used are familiar to a person skilled in the art or can be determined by him or her in routine tests.

The manner of bringing the water-in-water dispersion of the polymer P into contact with the fibrous web is of minor importance, provided the water-in-water dispersion is brought uniformly onto or into the fibrous web. The contacting is preferably effected by spraying the water-in-water dispersion of the polymer P onto the fibrous web or by drenching the fibrous web with the water-in-water dispersion.

According to the present invention, the water-in-water dispersion of the polymer P is used here in such an amount that the contacting with the fibrous web results in 1 to 300 parts by weight, preferably 10 to 200 parts by weight and more preferably 50 to 150 parts by weight of polymer P (solid), based on 100 parts by weight of fibrous web.

The impregnated fibrous web obtained after the contacting with the water-in-water dispersion of the polymer P, the organic compound V, and as the case may be, further optional auxiliary materials is dried/cured in a manner familiar to a person skilled in the art at a temperature≥120° C. to form the swellable nonwoven.

The drying of the impregnated fibrous web obtained to form a swellable nonwoven is frequently effected in two drying stages, the first drying stage being carried out at a temperature<120° C., preferably ≥20° C. and ≤110° C. and more preferably ≥40 and ≤100° C. and the second drying stage being carried out a temperature≥120° C., preferably ≥130° C. and ≤250° C. and more preferably ≥140° C. and ≤220° C.

The first drying stage is advantageously carried out by drying at a temperature<120° C. until the unfinished swellable nonwoven obtained, which frequently does not have its final shape yet (so-called semi-fabricate), has a residual moisture content 5.15% by weight, preferably ≤12% by weight and more preferably ≤10% by weight. The residual moisture content herein is generally determined by first weighing about 1 g of the (unfinished) swellable nonwoven obtained at room temperature, subsequently drying it at 110° C. for 10 minutes and thereafter cooling and reweighing it at room temperature. The residual moisture content is equal to the difference in weight of the (unfinished) swellable nonwoven before and after the drying operation, based on the weight of the (unfinished) swellable nonwoven before the drying operation multiplied by a factor of 100.

The semi-fabricate thus obtained is still formable after heating to temperature≥100 and can be brought at this temperature into the final shape of the desired swellable nonwoven.

The subsequent second drying stage is advantageously carried out by heating the semi-fabricate at a temperature≥120° C. until it forms the swellable nonwoven and has a residual moisture content≤1% by weight, preferably ≤0.5% by weight and more preferably ≤0.1% by weight, while the polymer P and the organic compound V generally undergo a chemical reaction of condensation and crosslink and cure.

The swellable nonwoven is frequently produced by the semi-fabricate being brought into the final shape, and cured, in a molding press in the aforementioned temperature ranges.

It will be appreciated, however, that it is also possible for the first (drying) and the second drying stage (curing) of the swellable nonwoven to be effected in one operation, for example in a molding press. When drying takes place in one operation, it is done at a temperature≥120° C.

The swellable nonwovens obtainable by following the process of the present invention advantageously have a sheetlike form, like for example sheetlike panels, membranes or strips, or else an elongate form whose ratio of length (L) to the largest extent of the cross section (D) L/D can be ≥2, ≥5, ≥10, ≥100, ≥1000 or ≥100 000, and whose cross section can have every conceivable shape, such as for example a round shape, such as in particular a circular or ellipsoidal shape or else an angular shape, such as in particular a triangular, quadrangular, such as for example a square or a rectangular shape. The swellable nonwovens of the present invention are superior to the prior art nonwovens in having a lower washoff loss with aqueous media, and therefore are advantageously useful for waterproofing, as for example in sealing membranes or joint-sealing tapes, for moisture regulation, as for example in interior moisture membranes or moisture membranes in air conditioners, for removing heavy metals from aqueous media, as for example in ion exchangers, for water absorption, as for example in absorbent wipes or absorption membranes and/or as moisture barrier.

The examples which follow illustrate the invention and are nonlimiting.

Example 1

A 2 l polymerization vessel equipped with an anchor stirrer and two metering devices was charged at 20 to 25° C. (room temperature) and under nitrogen atmosphere with 203 g of deionized water, 453 g of an 18.7% by weight aqueous solution of a vinyl acetate/polyethylene glycol graft polymer as polymer A (quantitative ratio: vinyl acetate/polyethylene glycol: 60/40; weight average molecular weight 24 000 g/mol), 214 g of a 35.3% by weight aqueous solution of a maleic anhydride-vinyl methyl ether copolymer as polymer B (quantitative ratio: maleic anhydride/vinyl methyl ether: 63/37; weight average molecular weight 165 000 g/mol; Lupasol® MS from BASF SE). To this solution were added with stirring 50 g of acrylic acid and 11 mg of 2,2'-azobis(2-amidinopropane)dihydrochloride (Wako® V 50 from Wako), dissolved in 2.2 g of deionized water, and the resulting reaction mixture was heated to 64° C. over 20 minutes. On attainment of this temperature the simultaneous metered addition is commenced of the monomer feed stream, consisting of 75 g of acrylic acid, 0.6 g of trimethylolpropane ethoxylate triacrylate (Sartomer® SR 9035 from Sartomer) and 75 g of deionized water, and of the initiator feed stream, consisting of 90 mg of Wako V 50 and 18.8 g of deionized water, and continued for 1.5 hours and 2 hours, respectively. On completion of the metered addition of the initiator feed stream, the polymerization mixture was subsequently stirred at 64° C. for 2 hours and was then admixed with a further 0.16 g of Wako V 50, dissolved in 31.4 g of deionized water. The aqueous polymer dispersion obtained was subsequently left to react at 64° C. for a further 1 hour before the addition of 0.6 g of L(+)-ascorbic acid and 1.1 g of a 70% by weight aqueous tert-butyl hydroperoxide solution. The water-in-water polymer dispersion obtained was subsequently allowed to react at 64° C. for a further 1 hour. Thereafter, the water-in-water polymer dispersion was cooled down to 45° C. and admixed with 125 g of a 50% by weight aqueous solution of a copolymer of acrylic acid and maleic anhydride in a weight ratio of 42/58 and having a weight average molecular weight of 3000 g/mol (Sokalan® CP 12S from BASF SE) and 12.5 g of a 30% by weight aqeuous solution of a fatty alcohol polyglycol ether sulfate sodium salt (Emulphor® FAS 30 from BASF SE) and the resulting water-in-water polymer dispersion was stirred at this temperature for 5 minutes. Thereafter, the temperature was lowered to room temperature and the water-in-water polymer dispersion obtained was admixed with 6.3 g of triethanolamine and subsequently stirred for 5 minutes. Thereafter, the solids content of the water-in-water polymer dispersion obtained was determined as 29.4% by weight and the viscosity as 560 mPas.

The solids content was generally determined by drying a defined amount of the water-in-water polymer dispersion (about 1 g) in an aluminum crucible having an internal diameter of about 5 cm at 120° C. in a drying cabinet to constant weight (about 2 hours). Two separate measurements were carried out for each dispersion. The values reported in the examples are the averages of the two measured results obtained in each case.

The viscosity was generally determined, at a given solids content of the respective water-in-water polymer dispersion, in accordance with DIN EN ISO 2555 using a Brookfield RVT viscometer, spindle 3, 20 revolutions per minute, at a temperature of 23° C.

Example 2

Example 1 was repeated except that 12.6 g of triethanolamine were added instead of 6.3 g of triethanolamine.

The solids content of the water-in-water polymer dispersion obtained was determined as 29.8% by weight and the viscosity as 720 mPas.

Comparative Example 1

Example 1 was repeated except that no triethanolamine was added.

The solids content of the water-in-water polymer dispersion obtained was determined as 28.9% by weight and the viscosity as 465 mPas.

Example 3

Example 1 was repeated except that 328 g of deionized water were initially charged instead of 203 g of deionized water, no copolymer of acrylic acid and maleic anhydride in a weight ratio of 42/58 and no 30% by weight aqueous solution of a fatty alcohol polyglycol ether sulfate sodium salt were added, and that only 0.6 g of triethanolamine was added after cooling instead of 6.3 g of triethanolamine.

The solids content of the water-in-water polymer dispersion obtained was determined as 24.3% by weight and the viscosity as 2020 mPas.

Comparative Example 2

Example 3 was repeated except that no triethanolamine was added.

The solids content of the water-in-water polymer dispersion obtained was determined as 24.1% by weight and the viscosity as 2225 mPas.

Example 4

Example 1 was repeated except that 264 g of deionized water were initially charged instead of 203 g of deionized water, 0.9 g of ethylene glycol diglycidyl ether (Decanol® EX-810 from Nagase Chemtex) was used instead of 0.6 g of trimethylolpropane ethoxylate triacrylate and 62.5 g instead of 125 g of copolymer of acrylic acid and maleic anhydride in a weight ratio of 42/58 were added, and that no triethanolamine was added after cooling.

The solids content of the water-in-water polymer dispersion obtained was determined as 26.2% by weight and the viscosity as 1050 mPas.

Example 5

Example 4 was repeated except that 2.3 g of ethylene glycol diglycidyl ether were used instead of 0.9 g of ethylene glycol diglycidyl ether.

The solids content of the water-in-water polymer dispersion obtained was determined as 26.1% by weight and the viscosity as 1060 mPas.

Example 6

Example 4 was repeated except that 3.7 g of ethylene glycol diglycidyl ether were used instead of 0.9 g of ethylene glycol diglycidyl ether.

The solids content of the water-in-water polymer dispersion obtained was determined as 26.5% by weight and the viscosity as 1070 mPas.

Example 7

Example 4 was repeated except that 5.1 g of ethylene glycol diglycidyl ether were used instead of 0.9 g of ethylene glycol diglycidyl ether.

The solids content of the water-in-water polymer dispersion obtained was determined as 26.7% by weight and the viscosity as 1090 mPas.

Example 8

Example 4 was repeated except that 6.0 g of ethylene glycol diglycidyl ether were used instead of 0.9 g of ethylene glycol diglycidyl ether.

The solids content of the water-in-water polymer dispersion obtained was determined as 26.4% by weight and the viscosity as 1150 mPas.

Comparative Example 3

Example 4 was repeated except that no ethylene glycol diglycidyl ether was used.

The solids content of the water-in-water polymer dispersion obtained was determined as 26.0% by weight and the viscosity as 1050 mPas.

Example 9

Comparative Example 3 was repeated except that, after the water-in-water polymer dispersion had cooled to room temperature, 28.5 g of D-glucose and 28.5 g of sodium hypophosphite were added.

The solids content of the water-in-water polymer dispersion obtained was determined as 29.2% by weight and the viscosity as 780 mPas.

Performance Testing

Production of Binder Liquors

The water-in-water polymer dispersions obtained in Examples 1 to 9 and Comparative Examples 1 to 3 were diluted at room temperature to a solids content of 24% by weight by addition of deionized water with stirring, and are hereinafter referred to as binder liquors B1 to B9 and also V1 to V3.

Production of Swellable Nonwovens

Swellable nonwovens were each produced by passing polypropylene (PP) needlefelts (29.7×21.0 cm [DIN A4] having a basis weight of 280 g/m$^2$) in the longitudinal direction via an endless PES foraminous belt at a belt travel speed of 60 cm per minute through each of the aforementioned aqueous binder liquors B1 to B9 and also V1 to V3. The aqueous binder liquor was subsequently sucked off to set a wet pickup of 1165 g/m$^2$ (corresponding to 280 g/m$^2$ of binder reckoned as solids). The impregnated PP needlefelts thus obtained, resting on a plastics mesh as support, were dried and cured for 14 minutes at 150° C. in a Mathis oven at maximum hot-air flow rate. In what follows, the swellable nonwovens thus obtained are referred to as QB1 to QB9 and also QV1 to QV3. After cooling to room temperature, round test specimens 105 mm in diameter were cut out of the resulting swellable nonwovens QB1 to QB9 and also QV1 to QV3. The test specimens obtained were subsequently stored for 24 hours at 23° C. and 50% relative humidity in a conditioning chamber.

Immediately before determination of the washoff loss, the test specimens obtained were dried in a drying cabinet at 80° C. for one hour, cooled down to room temperature and then weighed (weight of swellable nonwoven before water immersion=$GQ_{before}$). Subsequently, the test specimens were immersed in 1.5 l of deionized water for 24 hours at room temperature. Thereafter, the test specimens were removed from the water, dabbed dry with a cotton cloth, dried in a drying cabinet at 80° C. for 24 hours, cooled down to room temperature and reweighed (weight of swellable nonwoven after water immersion=$GQ_{after}$). The washoff loss computes from the weight difference of the respective dried swellable nonwovens before and after water immersion based on the weight of the swellable nonwovens before water immersion [washoff loss in %=$(GQ_{before}-GQ_{after}) \times 100/GQ_{before}$]. The results obtained are listed in Table 1. The lower the washoff loss, the better the results obtained. To determine washoff loss two separate determinations were carried out in each case. The values reported in Table 1 are the mean values of these 2 determinations.

TABLE 1

| Results of washoff loss tests | |
|---|---|
| Example | Washoff loss [in %] |
| QB1 | 13 |
| QB2 | 11 |
| QV1 | 30 |
| QB3 | 30 |
| QV2 | 46 |

TABLE 1-continued

Results of washoff loss tests

| Example | Washoff loss [in %] |
|---|---|
| QB4 | 18 |
| QB5 | 15 |
| QB6 | 14 |
| QB7 | 13 |
| QB8 | 13 |
| QV3 | 27 |
| QB9 | 15 |

From Table 1 above it is clearly evident that the post-crosslinked swellable nonwovens have a distinctly lower washoff loss compared with the nonpostcrosslinked swellable nonwovens.

The invention claimed is:

1. A process for producing a swellable nonwoven, the process comprising:
(1) contacting a fibrous web with a water-in-water dispersion of a polymer P to form an impregnated fibrous web;
(2) drying the impregnated fibrous web, said drying occurring after the contacting (1); and
(3)(a) admixing at least one organic compound to the dispersion of the polymer P, said admixing occurring before, during, or before and during, the contacting (1), or
(b) applying at least one organic compound to the impregnated fibrous web, said applying occurring after the contacting (1) and before the drying (2), or
(c) both admixing (3)(a) the at least one organic compound to the dispersion of the polymer P and applying (3)(b) the at least one organic compound to the impregnated fibrous web,
wherein the polymer P is prepared by free-radically initiated polymerization of at least one ethylenically unsaturated monomer (MON) in the presence of at least one a water-soluble polymer A and a water-soluble polymer B in an aqueous medium;
wherein the water-soluble polymer A is at least one selected from the group consisting of
(a1) a graft polymer of vinyl acetate, vinyl propionate, or both, on polyalkylene glycol or polyalkylene glycol substituted at one or both ends with at least one group selected from the group consisting of an alkyl, carboxyl, and amino group,
(a2) a copolymer of at least one alkylpolyalkylene glycol (meth)acrylate and (meth)acrylic acid,
(a3) a polyalkylene glycol, and
(a4) a polyalkylene glycol substituted at one or both ends with at least one group selected from the group consisting of an alkyl, carboxyl, and amino group;
wherein the water-soluble polymer B is at least one selected from the group consisting of
(b1) a hydrolyzed copolymer of at least one vinyl alkyl ether and maleic anhydride as a free polyacid or at least partially neutralized with at least one alkali metal hydroxide or at least one ammonium base,
(b2) a modified or unmodified starch, and
(b3) a synthetic copolymer obtained by copolymerization of
(β1) one or more nonionic monoethylenically unsaturated monomers,
(β2) one or more cationic monoethylenically unsaturated monomers, and
(β3) optionally one or more anionic monoethylenically unsaturated monomers;
wherein a molar fraction of the one or more cationic monoethylenically unsaturated monomers (β2) interpolymerized in the synthetic copolymer (b3) is higher than a fraction of interpolymerized anionic monoethylenically unsaturated monomers (β3); and
wherein the organic compound comprises at least two functional groups each of which is selected from the group consisting of a hydroxyl group, an epoxy group, a primary amino group and a secondary amino group,
the process further comprises:
(4)(a) admixing at least one phosphorus- or boron-containing inorganic compound to the water-in-water dispersion of the polymer P, wherein said admixing takes place before, during, or both before and during, the contacting (1) of the fibrous web with the water-in-water dispersion of the polymer P; or
(4)(b) applying at least one phosphorus- or boron-containing inorganic compound to the impregnated fibrous web, said applying occurring after the contacting (1) and before the drying (2); or
(4)(c) both admixing (4)(a) the at least one inorganic compound to the dispersion of the polymer P and applying (4)(b) the at least one inorganic compound to the impregnated fibrous web.

2. The process of claim 1, wherein the polymer P is prepared from at least one monomer selected from the group consisting of acrylic acid, methacrylic acid, maleic acid, 2-acrylamido-2-methylpropanesulfonic acid, and vinylsulfonic acid.

3. The process of claim 2, wherein an amount of the water-soluble polymer B is in the range from 1% to 100% by weight, based on a total amount of the at least one monomer MON.

4. The process of claim 2, wherein a ratio of the amounts of the water-soluble polymer A to the water-soluble polymer B is in the range from 1:10 to 10:1.

5. The process of claim 2, wherein
the contacting (1) of the fibrous web is with 1 to 300 parts by weight of the polymer P, based on 100 parts by weight of the fibrous web, and
the said parts by weight of the polymer P correspond to a sum total of total amounts of the at least one monomer MON, the water-soluble polymer A, and the water-soluble polymer B.

6. The process of claim 2, wherein the at least one organic compound has an average molecular weight≤1000 g/mol.

7. The process of claim 1, wherein an amount of the water-soluble polymer B is in the range from 1% to 100% by weight, based on a total amount of the at least one monomer MON.

8. The process of claim 1, wherein a ratio of the amounts of the water-soluble polymer A to the water-soluble polymer B is in the range from 1:10 to 10:1.

9. The process of claim 1, wherein
the contacting (1) of the fibrous web is with 1 to 300 parts by weight of the polymer P, based on 100 parts by weight of the fibrous web, and
the said parts by weight of the polymer P correspond to a sum total of total amounts of the at least one monomer MON, the water-soluble polymer A, and the water-soluble polymer B.

10. The process of claim 1, wherein the at least one organic compound has an average molecular weight≤1000 g/mol.

11. The process of claim 1, wherein the at least one organic compound is selected from the group consisting of ethanolamine, diethanolamine, triethanolamine, 3-amino-1-propanol, 1-amino-2-propanol, 5-amino-1-pentanol, 2-(2-aminoethoxy)ethanol, N-(2-aminoethyl)ethanolamine, bis(N-hydroxyethyl)propane-1,3-diamine, diisopropanolamine, triisopropanolamine, N-methyldiethanolamine, N-butyldiethanolamine, ethylene glycol, diethylene glycol, triethylene glycol, 1,2-propanediol, 1,2,3-propanetriol, 1,2-butanediol, 1,4-butanediol, 2,3-butanediol, neopentyl glycol, trimethylolpropane, 1,2-pentanediol, 1,5-pentanediol, 1,6-hexanediol, 2,5-dimethyl-2,5-hexanediol, D-arabinose, L-arabinose, D-xylose, D-glucose, D-mannose, D-gallactose, D-glucosamine, D-fructose, maltose, sucrose, lactose, ethylenediamine, diethylenetriamine, triethylenetetramine, 1,3-propanediamine, 1,2-propanediamine, neopentyldiamine, hexamethylenediamine, octamethylenediamine, N-(2-aminoethyl)propane-1,3-diamine, 1,2,3-propanetriamine, N,N-bis(3-aminopropylamine), ethylene glycol diglycidyl ether, diethylene glycol diglycidyl ether, 1,2-propylene glycol diglycidyl ether and di-1,2-propylene glycol diglycidyl ether.

12. The process of claim 1, wherein an amount of the at least one organic compound is from 0.001 to 10 parts by weight, based on 100 parts by weight of the polymer P.

13. The process of claim 1, wherein an amount of the at least one inorganic compound is from 0.0001 to 10 parts by weight, based on 100 parts by weight of the polymer P.

14. The process of claim 1, wherein the inorganic compound comprises at least one selected from the group consisting of phosphoric acid, polyphosphoric acid, alkylphosphinic acids, a alkylphosphonic acid, hypophosphorous acid, phosphorous acid, tetrafluoroboric acid, and an alkali metal salt thereof.

15. The process of claim 1, wherein the drying (2) of the impregnated fibrous web occurs at a temperature≥120° C.

16. A swellable nonwoven obtained by the process of claim 1.

17. A process for at least one application selected from the group consisting of waterproofing, moisture regulation, removing heavy metals from aqueous media, water absorption, and forming a moisture barrier, the process comprising contacting the swellable nonwoven of claim 16 with a liquid or solid.

18. The process of claim 1, wherein the drying (2) of the impregnated fibrous web occurs at a temperature≥120° C.

19. The process of claim 1, wherein the at least one ethylenically unsaturated monomer (MON) is at least one monomer selected from the group consisting of a water-soluble nitrogenous ethylenically unsaturated monomer and water-soluble anionic ethylenically unsaturated monomer.

20. The process of claim 19, wherein the water-soluble nitrogenous ethylenically unsaturated monomer is at least one monomer selected from the group consisting of N-vinylformamide, N-vinylacetamide, N-vinylimidazole, and N-vinylpyrrolidone.

21. The process of claim 19, wherein the water-soluble anionic ethylenically unsaturated monomer is at least one monomer selected from the group consisting of a monoethylenically unsaturated $C_3$- to $C_6$-carboxylic acid, ethylenically unsaturated sulfonic acid, and vinylphosphonic acid

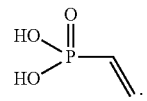

22. The process of claim 19, wherein the water-soluble anionic ethylenically unsaturated monomer comprises at least one acid selected from the group consisting of acrylic acid, methacrylic acid, maleic acid, 2-acrylamido-2-methylpropanesulfonic acid, and vinylsulfonic acid.

23. The process of claim 19, wherein the water-soluble anionic ethylenically unsaturated monomer is in a form of a free acid, an alkali metal, or an ammonium salt.

24. The process of claim 19, wherein the water-soluble anionic ethylenically unsaturated monomers is a monoethylenically unsaturated $C_3$- to $C_6$-mono- and dicarboxylic acid, wherein the acid is selected from the group consisting of acrylic acid, methacrylic acid, ethylacrylic acid, crotonic acid, itaconic acid, maleic acid, and fumaric acid.

25. The process of claim 19, wherein the water-soluble anionic ethylenically unsaturated monomer is an ethylenically unsaturated sulfonic acid selected from the group consisting of vinylsulfonic acid, styrenesulfonic acid, para-styrenesulfonic acid, 2-acrylamido-2-methylpropanesulfonic acid, and

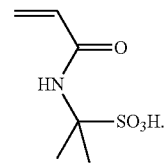

26. The process of claim 1, wherein the organic compound comprising at least two functional groups does not have an average molecular weight greater than 1,000 g/mol.

* * * * *